United States Patent [19]

Simmons

[11] Patent Number: 4,525,034
[45] Date of Patent: Jun. 25, 1985

[54] POLARIZING RETROREFLECTING PRISM

[76] Inventor: Clarke V. Simmons, 9020 Charles Augustine Dr., Alexandria, Va. 22308

[21] Appl. No.: 447,726

[22] Filed: Dec. 7, 1982

[51] Int. Cl.³ ............................ G02B 5/30; G02B 5/04
[52] U.S. Cl. .................................. 350/395; 350/286; 372/16
[58] Field of Search ................. 350/97, 102, 286–287, 350/394–395, 402; 372/14–17, 100, 108

[56] References Cited

U.S. PATENT DOCUMENTS

| | | | |
|---|---|---|---|
| 2,432,432 | 12/1947 | MacNeille | 350/394 |
| 3,388,314 | 6/1968 | Gould | 372/100 |
| 3,402,364 | 9/1968 | De Lang | 350/394 |
| 3,540,801 | 11/1970 | Schmidt | 350/102 |

FOREIGN PATENT DOCUMENTS 893237 2/1972 Canada ................. 350/286

OTHER PUBLICATIONS

De Jong, A. N., "A Novel Prism for Total Reflection" Optica Acta, 4-1963, pp. 115-119.
Southhall, J. P. C., "Mirrors, Prisms & Lenses", Mac-Millan Co. 1923, pp. 50-51.

Primary Examiner—William H. Punter
Attorney, Agent, or Firm—Anthony T. Lane; Milton W. Lee; Max L. Harwell

[57] ABSTRACT

An improved prism which polarizes and retroreflects a light beam which is incident thereto at the Brewster's angle. The principles of the Brewster window, corner reflector, and total internal reflection, such as at the ends of a laser cavity, is incorporated into a single optical device. When correctly polarized light, with respect to the Brewster angle entrance to the prism, strikes the specially shaped right angle prism at the Brewster's angle, the light will be retroreflected straight back paralled to the incoming beam without significant losses.

6 Claims, 3 Drawing Figures

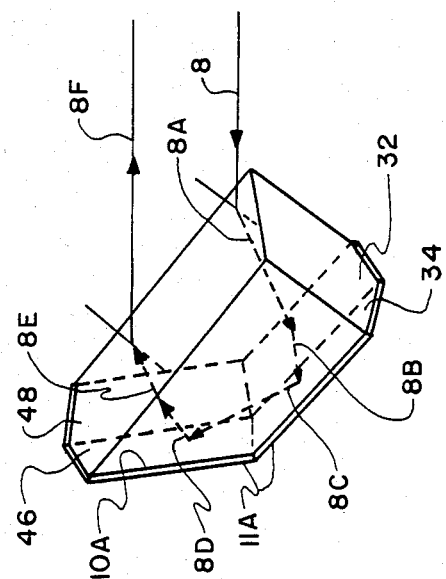
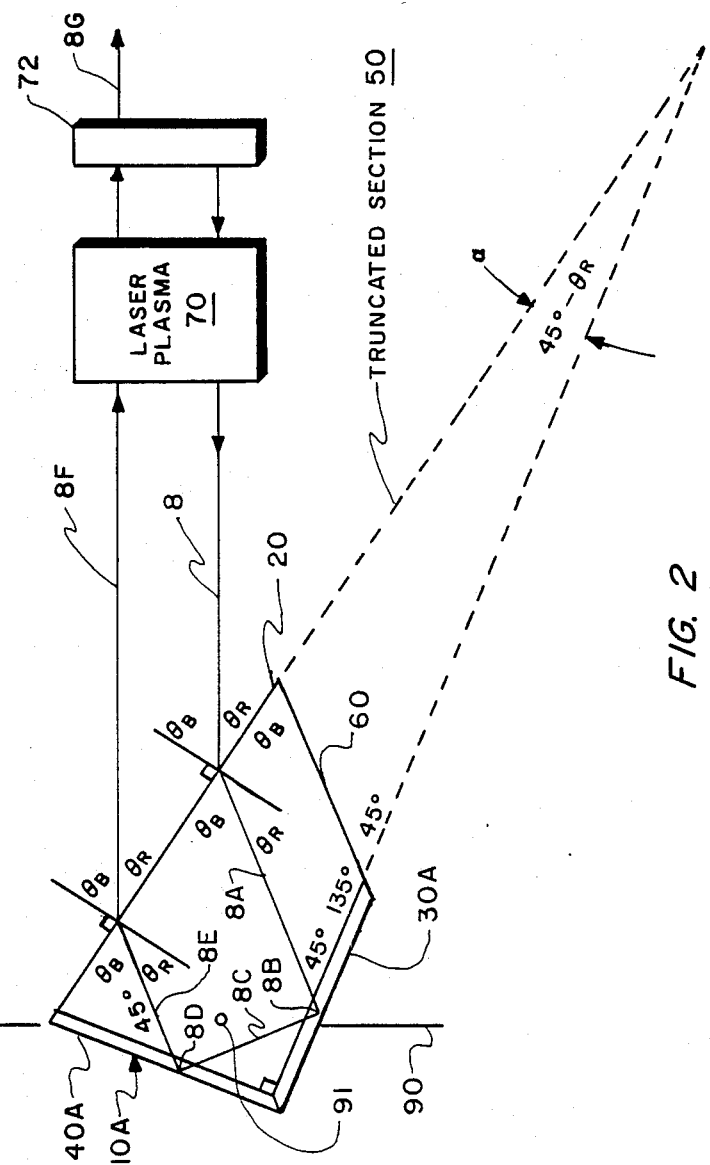

POLARIZING RETROREFLECTING PRISM

The invention described herein may be manufactured, used, and licensed by the U.S. Government for government purposes without payment of any royalties thereon.

BACKGROUND OF THE INVENTION

1. Field of the invention.

The invention is in the field of polarizing retroreflecting prisms convenient for use in lasers and optical scanning or similar systems.

2. Description of prior art.

There are many type prisms used in the various state-of-the-art optical systems. A particular prism may be constructed to deviate, displace, and reflect light in various ways and to reflect or refract an image in combinations of normal, erect, inverted, and reverted images. Prisms may be used in laser systems or optical scanning systems to provide polarization of the laser light, Q-switching of the laser, sweep of an image, offset of a light beam, or the like. The use of the present polarizing retroreflecting prism, say as the so called 100% reflecting end mirror of a laser cavity or for image sweeping in an optical scanning system, solves many inherent problems. Not only must the laser reflecting end mirrors have extremely high reflectivity for laser propagation but also must be aligned with expensive micrometer adjusted laser mirror mounts and should have a long life free of chemical degradation of exposed optical coatings. Further, a polarized beam is essential to many laser applications and a separate Brewsters window is used along with the reflecting end mirror. All of the above problems can be solved with the present polarizing retroreflecting prism, and when compared to mirrors currently used in lasers has major advantages in simplicity, effectiveness, and low cost.

SUMMARY OF THE INVENTION

The present polarizing retroreflecting prism combines the optical principles of the Brewster's angle, corner reflector, and total internal reflection into one special geometrically shaped prism. When correctly polarized light strikes this specially shaped prism at the Brewster angle of an entrance surface thereof, it will be retroreflected, i.e. bounced straight back, parellel to the incoming beam without a transmission loss except for very slight absorption by the prism optical material. The prism therefore acts like a highly reflective mirror, similar to the fully reflective end mirror at one end of a laser cavity. When used in a laser cavity, the Brewster's angle of entrance to the prism acts like a Brewster window thus inherently polarizing the output beam while eliminating the need for intracavity Brewster windows. The Brewster angle is a soft angle, i.e. small deviations from the optimum result in only negligible losses, giving the prism an insensitivity to alignment and an angle of freedom impossible with conventional laser optics. This angle of freedom is defined as where the prism's effective reflectivity is only minimally affected by misalignment. By using quartz with an index of refraction of 1.459 for red light, an angle of freedom of about 3°; i.e.+or −1.5° from the optimum, results from the Brewster angle and total internal reflection critical angle effects. This simple geometric optic is uncoated and therefore it is low cost and has unlimited life. This single optical device can replace the conventional fully reflective end mirror and Brewster window in a laser cavity with improvements in performance, durability and cost while producing a polarized laser beam without a complex design. Alignment of the retroreflecting prism is not as critical as with the separate Brewster window and end mirror.

The insensitivity of the prism to alignment is its greatest attribute. Since the prism is insensitive to fine alignment, very simple and rugged mounts can be used to hold the prism and have a resulting cost savings by elimination of the expensive micrometer adjusted laser mirror mounts currently used in alignment. Many untapped markets and applications of the laser previously restricted by cost can now be explored and developed. The use of the prism as a discrete optical component may be more wide ranging than just its use with the laser itself even though the explanation herein is with reference to use in a laser cavity. The prism's variable intensity retroreflections produced when the angle of freedom is exceeded has used in optical scanning systems for providing output pulses when the prism is rotated.

Environmental effects hostile to laser operation or damaging to laser optics can also now be dealt with effectively. Chemical degradation of exposed optical coatings within the plasma tube is eliminated since the prism does not require coatings. The U.S. Air Force has had problems with its laser target designators stemming from vibrations onboard the aircraft. Early indications are that the prism is an answer to the vibration problems.

The novel polarizing retroreflecting prism is a right angle prism specifically built to provide the soft Brewster's angle where slight deviation from the optimum angle results in only minor effects or losses. The physical description of the prism is that of a cutaway of a truncated section portending to an apex of a wedge at an angle of 45°−$\theta R$, where $\theta R$ is the refraction angle of an incident light beam and $\theta R$ is also the complementary angle of the Brewster's angle $\theta R$. The truncated section of the wedge angle is cut at a 135° angle with the prism secondary internal reflecting surface. The cut is started from the secondary internal reflecting surface at a point where both the secondary and tertiary internal reflecting surfaces are of the same length. The secondary and tertiary internal reflecting surfaces are also at a right angle from each other.

One embodiment of the prism is comprised of flat secondary and tertiary reflecting internal surfaces. Another embodiment is comprised of secondary and tertiary reflecting internal surfaces which are cut into the form of a roofed prism. The flat reflecting internal surfaces give insensitivity to prism alignment in one plane and the roofed prism internal reflecting surfaces give insensitivity to prism alignment in both planes of orientation with regard to the incoming beam but of course with two more internal reflections between the two roofed surfaces. The prism may have a reflective coating, such as one or more silvered layers, at the back of secondary and tertiary reflecting internal surfaces for enhancing internal reflections and preventing external light from entering the prism. If the incoming beam is within the angle of freedom, which as stated above for quartz is about 3°, reflective coatings on the internal surfaces are not necessary.

BRIEF DESCRIPTION OF THE DRAWINGS

FIG. 2 illustrates schematically the prism with roofed prism internal reflecting surfaces; and FIG. 3 shows a perspective view of the prism of FIG. 2.

DETAILED DESCRIPTION OF THE PREFERRED EMBODIMENTS

Figure 1:
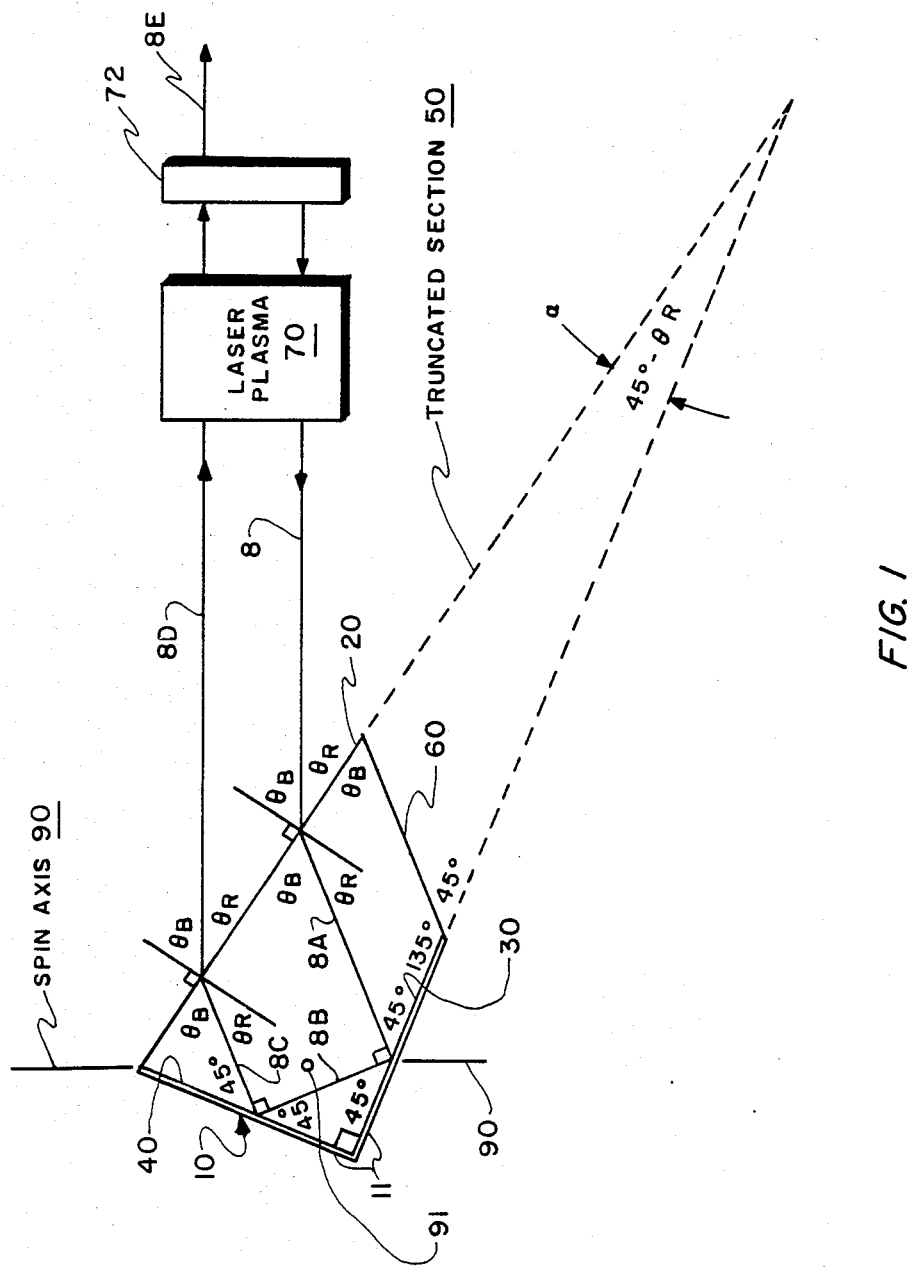
FIG. 1 illustrates schematically the polarizing retroreflecting prism with flat internal reflecting surfaces.

Looking now to FIG. 1, the prism 10 has an input light surface 20, or Brewster angle entrance surface, and secondary and tertiary flat internal reflecting surfaces 30 and 40 respectively at 90° from each other. It should be noted that the extensions of sides 20 and 30 portend to a point to form a truncated section 50, merging at an angle $\alpha$, which is in actuality $45° - \theta R$, where $\theta R$ is the refraction angle at the Brewster angle entrance surface 20. The refraction angle $\theta R$ is the complement of the Brewster's angle $\theta B$. The prism 10 is cut across surface 60 of prism 10 so that surfaces 30 and 40 are of the same length. The angle at which the cut is made is as shown, i.e. at an internal angle of 135° on the short side. The internal angle between side 20 and surface 60 is at the Brewster's angle. The incoming beam 8 is refracted within prism 10 into beam 8A, which is then internally reflected as beam 8B from surface 30 to surface 40. Beam 8B is then internally reflected off surface 40 as beam 8C and is refracted upon exiting prism 10 at the entrance surface 20 into beam 8D which is retroreflected parallel to the incoming or incident beam 8. This specifically shaped prism produces the polarization of the incident beam and total retroreflection therefrom with loss only according to the quality of the prism 10 and surface finish material. In a laser environment, beams 8 and 8D are bounced back and forth through a laser plasma 70 to eventually be dumped out the output coupler 72, or 95% reflective mirror, as laser beam 8E.

FIGS. 2 and 3 illustrate another embodiment of the same basic prism, herein referred to as prism 10A. Prism 10A has roofed prism sections 30A and 40A respectively cut into the secondary and tertiary internal reflecting surfaces which gives this prism another degree of insensitivity to prism alignment to the flat surfaced secondary and tertiary surfaces 30 and 40 of prism 10. The flat surfaces 30 and 40 give insensitivity to prism alignment in one plane. However, with the roofed sections 30A and 40A the extra surfaces 32 and 34 of 30A and 46 and 48 of 40A give an insensitivity to prism alignment in both planes of orientation with regard to the incoming light beam. The two extra beam paths 8B and 8D of the internal beam paths 8A through 8E have only slight effects on losses or problems in transmission purity.

The secondary and tertiary internal reflecting surfaces may have a reflective coating thereon to enhance reflection when the incoming beam 8 is outside the angle of freedom, i.e. outside where the prisms effective reflectivity is only minimally affected by misalignment. These reflective coatings on the secondary and tertiary internal reflecting surfaces are represented by numerals 11 and 11A respectively in FIGS. 1 and 3. Reflective coatings also serve to keep extraneous light out of the prism. Either of the two prisms 10 and 10A of the present specific shape however have a good degree of freedom without sophisticated micrometer alignment and do not require reflecting coatings to provide the needed high reflectivity for proper laser operation. The reason that either prism has a good degree of freedom is that the prism has a soft Brewster's angle, i.e. deviation from the optimum entrance angle results in only minor effects. When either prism 10 or 10A are placed at the Brewster angle, the Brewster angle of entry $\theta B$ acts like a Brewster window thus inherently polarizing the output beam while eliminating the need for an intercavity Brewsters window. The secondary and tertiary internal reflecting surfaces function as the corner reflector of a cavity laser.

FIGS. 1 and 2 show by block diagram form the present polarizing retroreflecting prisms 10 and 10A respectively in a laser cavity environment. In FIG. 1, beams 8 and 8D are bounced back and forth through laser plasma 70 to eventually be dumped through output coupler 72 as laser beam 8E. FIG. 2 ilustrates beams 8 and 8F bouncing back and forth through laser plasma 70 and dumped through output coupler 72 as laser beam 8G.

Another function of either of the prisms 10 may be that the prism rotates through 360° in one plane, say about either spin axis 90 or spin axis 91 which is orthogonal to axis 90, as the fully reflecting end mirror and acts as a Q-switch for the laser cavity since at least one output pulse is produced upon each rotation. If either prism is rotated about spin axis 90, only one pulse is produced for each 360° of rotation. However, if either prism is rotated about spin axis 91, shown only as a small circle but orthogonal to spin axis 90, two quick pulses are produced for each 360° of rotation.

The prisms 10 or 10A may be made of high quality optical material, such as quartz or glass for use in the visible spectrum, or may be made of zinc selenide or germanium for use in the infrared spectrum. The prism surfaces may be ground and polished for better reflectivity. The physical dimensions of the prism is not limited. However, the shorter the path for the light beams to pass through the prism the fewer losses there will be. With the shortest path length as a criteria, each prism should be as small as required for any particular operation.

From the foregoing it will be appreciated that a simple and effective yet novel polarizing retroreflecting prism has been disclosed which has many functions as a polarizing retroreflector and it should be understood that although the prism has been described in a laser environment or optical scanning system other uses or modifications thereof will be readily apparent to those skilled in the art without departing from the spirit and scope of the invention as defined in the appended claims.

I claim:

1. A specially shaped right angle prism for polarizing and parallel retroreflecting light beams incident thereon at the Brewster's angle entrance surface wherein the Brewster angle of entrance to said prism is a soft angle giving said prism insensitivity to alignment with a large angle of freedom for said Brewster's angle, said prism comprised of a secondary internal reflecting surface and a tertiary internal reflecting surface at a right angle to each other with each reflecting surface cut into the form of a roofed prism giving insensitivity to prism alignment in both planes of orientation with regard to the incoming beam and a cut-away of a truncated section cut at a 135° angle with respect to said secondary internal reflecting surface at a point making said secondary and tertiary internal reflecting surfaces of the same length wherein said truncated section portends from said entrance surface and said secondary internal reflecting surface to an apex of a wedge at an angle of 45°−−$\theta R$ where $\theta R$ is defined as the refraction angle of an incident light beam and is a complimentary angle of the Brewster's angle $\theta B$.

2. A prism as set forth in claim 1 wherein said prism is made of quartz with an index of refraction of 1.459 and said angle of freedom for said Brewster's angle and the total internal reflection critical effects is about 3°.

3. A prism as set forth in claim 1 wherein said secondary and tertiary internal reflecting surfaces have a reflective coating outer layer.

4. In a laser cavity device an improved right angle prism with a soft angle Brewster angle entrance surface for polarizing a highly retroreflecting laser cavity light incident on said entrance surface thereof back to an output coupler in a laser cavity pumping process wherein said entrance surface acts like a Brewster window for polarizing the light incident thereon wherein said prism is comprised of a secondary internal reflecting surface and a tertiary internal reflecting surface at a right angle to each other with each reflecting surface cut into the form of a roofed prism and of the same length to act as a highly reflective corner reflector end mirror in which a cut-away of a truncated section is cut at a 135° angle with said secondary internal reflecting surface wherein said truncated section portends from said entrance surface and said secondary internal reflecting surface to an apex of a wedge at an angle of 45°−$\theta R$ where $\theta R$ is defined as the refraction angle of a light beam incident upon said soft angle Brewster angle entrance surface and is a complementary angle of the Brewster's angle $\theta B$.

5. A laser device as set forth in claim 4 wherein said prism rotates about a 360° plane wherein said prism retroreflects at least one closely spaced bundle of light back to said output coupler for each complete rotation of said prism.

6. A laser device as set forth in claim 4 wherein said secondary or tertiary internal reflecting surfaces have a reflective coating outer layer.

* * * * *